(12) United States Patent
Fendt

(10) Patent No.: US 9,828,000 B2
(45) Date of Patent: Nov. 28, 2017

(54) METHOD AND DEVICE FOR CONTROLLING A VEHICLE

(71) Applicant: Conti Temic microelectronic GmbH, Nuremberg (DE)

(72) Inventor: Guenter Anton Fendt, Schrobenhausen (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 0 days.

(21) Appl. No.: 15/030,076

(22) PCT Filed: Sep. 30, 2014

(86) PCT No.: PCT/EP2014/070958
§ 371 (c)(1),
(2) Date: Apr. 18, 2016

(87) PCT Pub. No.: WO2015/055428
PCT Pub. Date: Apr. 23, 2015

(65) Prior Publication Data
US 2016/0251019 A1 Sep. 1, 2016

(30) Foreign Application Priority Data

Oct. 16, 2013 (DE) .................. 10 2013 220 948

(51) Int. Cl.
*B60W 50/12* (2012.01)
*B60W 50/10* (2012.01)

(52) U.S. Cl.
CPC ............ *B60W 50/12* (2013.01); *B60W 50/10* (2013.01)

(58) Field of Classification Search
CPC ...... B60W 50/12; B60W 50/10; B60R 21/017
See application file for complete search history.

(56) References Cited

U.S. PATENT DOCUMENTS 6,653,747 B1 * 11/2003 Proefke .................. B60R 25/24
307/10.6
8,122,994 B2   2/2012 Bluhm ........................ 180/287
(Continued)

FOREIGN PATENT DOCUMENTS

DE       2517723 A1    11/1976   ........... B60R 25/021
DE      10000857 A1     7/2001   ........... B60R 25/021
(Continued)

OTHER PUBLICATIONS

German Office Action, Application No. 102013220948.7, 10 pages, dated Apr. 17, 2014.
(Continued)

*Primary Examiner* — Michael J Zanelli
(74) *Attorney, Agent, or Firm* — Slayden Grubert Beard PLLC

(57) ABSTRACT

A method for controlling a vehicle may include sensing the presence of a switch-off signal indicative of a command to switch off an ignition of a drive assembly of the vehicle, measuring a voltage value of an on-board power system voltage in an on-board power system of the vehicle in response to sensing the switch-off signal, and comparing the measured voltage value to a predetermined voltage threshold value. If the measured voltage value exceeds the predetermined voltage threshold value, the method may include switching an assistance system of the vehicle into an emergency operating state.

6 Claims, 2 Drawing Sheets

(56) References Cited

U.S. PATENT DOCUMENTS

2014/0350788 A1* 11/2014 Byun .................. B62D 5/0481
                                                    701/41
2015/0375703 A1* 12/2015 Modi ................... B60R 21/017
                                                    307/10.1

FOREIGN PATENT DOCUMENTS

| DE | 102007055645 A1 | 5/2009  | ............. B60R 16/02  |
| DE | 102008026612 A1 | 12/2009 | ........... B60R 25/021 |
| DE | 102008043389 A1 | 5/2010  | ........... B60W 50/00  |
| DE | 102010046271 A1 | 3/2012  | ............. B60R 25/00  |
| DE | 102011010203 A1 | 8/2012  | ............... B60L 3/00   |
| EP |         1698531 A1 | 9/2006  | ........... B60R 25/021 |
| EP |         2570320 A1 | 3/2013  | ............. B60R 16/02  |
| WO |    2015/055428 A1 | 4/2015  | ............. B60W 50/10  |

OTHER PUBLICATIONS

International Search Report and Written Opinion, Application No. PCT/EP2014/070958, 16 pages, dated Jan. 19, 2015.

\* cited by examiner

METHOD AND DEVICE FOR CONTROLLING A VEHICLE

CROSS-REFERENCE TO RELATED APPLICATIONS

This application is a U.S. National Stage Application of International Application No. PCT/EP2014/070958 filed Sep. 30, 2014, which designates the United States of America, and claims priority to DE Application No. 10 2013 220 948.7 filed Oct. 16, 2013, the contents of which are hereby incorporated by reference in their entirety.

TECHNICAL FIELD

The present disclosure relates to a method and to a device for controlling a vehicle. More specifically, the disclosure relates to an on-board power system comprising the device and to a vehicle comprising the device.

BACKGROUND

Modern vehicles are equipped with an ignition lock arrangement which is arranged in the area of a dashboard or a center console of the vehicle and typically has a keyhole for receiving a vehicle key. In this context, a vehicle key can assume at least two different positions in the keyhole, one of the positions representing a vehicle state "ignition on" and the other position representing a vehicle state "ignition off". If the key is in the "ignition on" position, a drive assembly of the vehicle together with a generator is switched on which then drives the vehicle. If the drive assembly is switched on, the generator generates electric current and feeds an on-board power system of the vehicle with this current. If, however, the key is in the "ignition off" position, the drive assembly together with the generator is switched off. In this switched-off state, the generator does not generate any current for the on-board power system. The term "ignition lock arrangement" also means generic arrangements such as, for example, a button for "start/stop".

The modern vehicles are also equipped with various electronic systems which, in combination, are called "(vehicle) assistance system" and perform different vehicle-safety-related and comfort functions. These systems operate in normal operation and perform assigned functions completely as long as the drive assembly is switched on and the generator feeds current into the on-board power system. As soon as the drive assembly is switched off and the generator no longer feeds current into the on-board power system, the electronic systems are switched off or switched into a rest phase in which the safety of the vehicle can no longer be guaranteed completely.

Modern vehicles are also equipped with an electrical steering wheel locking arrangement which unlocks a steering wheel of the vehicle when the vehicle key in the keyhole changes from the "ignition off" position into the "ignition on" position, i.e., when the vehicle key has been authenticated positively, and locks the steering wheel when the vehicle key changes from the "ignition on" position into the "ignition off" position, i.e., when the vehicle key is taken from the keyhole. If the electrical steering wheel locking arrangement locks the steering wheel, the vehicle becomes no longer steerable and thus not controllable.

Since the ignition lock arrangement, together with the keyhole, is in an area of a dashboard or of a center console of the vehicle where there are also many operating elements such as, for example, operating elements of a navigation system or of air conditioning control, it may happen that the vehicle key, which is located in the keyhole, is accidentally touched by the driver or another passenger of the vehicle and is thus switched from the "ignition on" position into the "ignition off" position.

It may also happen that due to errors in the electrical systems of the vehicle control or in the signal connections between the electrical systems, a signal is falsely generated or detected which is indicative of the position of the vehicle key in the "ignition off" position, although the vehicle key is in the "ignition on" position.

In consequence, it may happen that the electrical systems are falsely switched off and the steering wheel is locked by the electrical steering wheel locking arrangement.

If, however, the vehicle is in a driving mode on a street, an above-mentioned accidental switching over of the vehicle key or an above-mentioned faulty signal can lead to an accident because the vehicle safety-related systems are switched off and the steering wheel is locked and the vehicle thus becomes no longer steerable.

SUMMARY OF THE INVENTION

The object of the present disclosure, therefore, is to provide a possibility of rendering the vehicle safer.

In some embodiments, a method for controlling a vehicle may include the following method steps:
  the presence of a switch-off signal which is indicative of a command to switch off the ignition of a drive assembly of the vehicle,
  measuring of a voltage value of an on-board power system voltage in an on-board power system of the vehicle when the switch-off signal is detected,
  comparing the measured voltage value with a predetermined voltage threshold value, and
  switching of an assistance system of the vehicle into an emergency operating state when the measured voltage value exceeds the predetermined voltage threshold value.

Accordingly, it is monitored during a driving mode of the vehicle whether a switch-off signal is present which is generated on switching the vehicle key from the "ignition on" position into the "ignition off" position and is thus indicative of a command to switch off the ignition of the drive assembly of the vehicle. As soon as the switch-off signal is detected, a voltage value of an on-board power system voltage is measured in the on-board power system of the vehicle. The measured voltage value is subsequently compared with a predetermined voltage threshold value. If the measured voltage value exceeds the voltage threshold value, the assistance system of the vehicle is switched into an emergency operating state.

In this context, an emergency operating state means a state of the assistance system in which only the vehicle safety-related functions of the assistance system are kept running. The vehicle safety-related functions include, for example, an antiblocking function, a vehicle stabilization function, or a distance control function.

In this context, the drive assembly of the vehicle comprises a generator which, when the drive assembly is operated, generates current and feeds it into the on-board power system.

The voltage threshold value is preferably chosen in such a manner that it corresponds to a voltage value of the on-board power system voltage in the on-board power system when the generator feeds current into the on-board power system.

By means of the above-mentioned method it is possible, in the case of an unintentional switch-over of the vehicle key from the "ignition on" position into the "ignition off" position, still to check by means of the on-board power system voltage whether the vehicle is in a driving mode. Since the generator of the drive assembly of the vehicle always feeds current into the on-board power system in a driving mode of the vehicle and maintains the on-board power system voltage at a voltage value, a current voltage value of the on-board power system voltage allows conclusion to be drawn whether the switch-off signal was faulty or unintentional or not. Since the generator of the vehicle still generates current in a temporary standstill of the vehicle, for example in front of a red traffic light or in a braking process of the vehicle, unintentional switching-over of the vehicle key or the faulty switch-off signal, respectively, can also be detected unproblematically in such situations.

Thus, a method has been created by means of which the vehicle or driving with the vehicle, respectively, becomes safer.

In some embodiments, the assistance system is switched into the emergency operating state only when a vehicle key is authenticated positively. This prevents a manipulation of the vehicle by an unauthorized stranger.

In some embodiments, a steering wheel of the vehicle is not locked when the measured voltage threshold value exceeds the specified voltage threshold value even though the switch-off signal is detected. By this means, the vehicle still remains controllable in the case of an unintended switch-over of the vehicle key or the faulty switch-off signal, respectively, and accidents are thus avoided.

Analogously, the steering wheel is preferably also not locked only when the vehicle key is authenticated positively. By means of this precondition of a positive authentication, it is avoided that the steering wheel is unlocked by unauthorized persons having a false vehicle key. This effectively prevents a theft of the vehicle by external starting of the vehicle although the voltage value of the on-board power system voltage can also exceed the voltage threshold value.

In some embodiments, the assistance system is switched off only when the switch-off signal is detected and the measured voltage value does not exceed the predetermined voltage threshold value. This ensures that the safety-related assistance system is also reliably switched off when the vehicle is absolutely stationary and the drive assembly together with the generator is in an operating state in which the generator generates no or no adequate current for an on-board power system.

Analogously, the steering wheel is locked, in some embodiments, only when the switch-off signal is detected and the measured voltage value does not exceed the specified voltage threshold value. This ensures that the vehicle is also parked in a theft-proof manner when the driver or the passengers subsequently leave the vehicle.

In some embodiments of the present disclosure, a device for controlling a vehicle comprises:
- a detection unit for detecting a switch-off signal which is indicative of a command to switch off the ignition of a drive assembly of the vehicle,
- a measuring unit for measuring a voltage value of an on-board power system voltage in an on-board power system of the vehicle when the switch-off signal is detected,
- a comparison unit for comparing the measured voltage value with a predetermined voltage threshold value,
- a control unit for switching an assistance system of the vehicle into an emergency operating state when the measured voltage value exceeds the predetermined voltage threshold value.

In some embodiments, an on-board power system of a vehicle has an assistance system for controlling the vehicle which, in dependence on a vehicle state, can be switched between a normal operating state, that is to say a switched-on operating state in which the assistance system performs both safety-related and non-safety-related functions such as vehicle comfort functions, a switched-off state in which the assistance system does not perform any functions, and an emergency operating state, that is to say a switched-on operating state in which the assistance system only performs the safety-related functions. Furthermore, the on-board power system has a steering wheel locking arrangement for locking/unlocking a steering wheel of the vehicle and a device, described before, for controlling the vehicle or the assistance system and/or the steering wheel locking arrangement.

In some embodiments, a vehicle has an assistance system, described before, for controlling the vehicle, a steering wheel locking arrangement for locking/unlocking a steering wheel of the vehicle and a device, described before, for controlling the vehicle or the assistance system, respectively, and/or the steering wheel locking arrangement.

Various embodiments of the method described above, as far as they are otherwise transferable to the above-mentioned device, the above-mentioned on-board power system or the above-mentioned vehicle, respectively, can also be considered as embodiments of the device or of the on-board power system or of the vehicle, respectively.

BRIEF DESCRIPTION OF THE DRAWINGS

In the text which follows, exemplary embodiments of the invention are explained in greater detail, referring to the attached drawings, in which.

DETAILED DESCRIPTION

Figure 1:
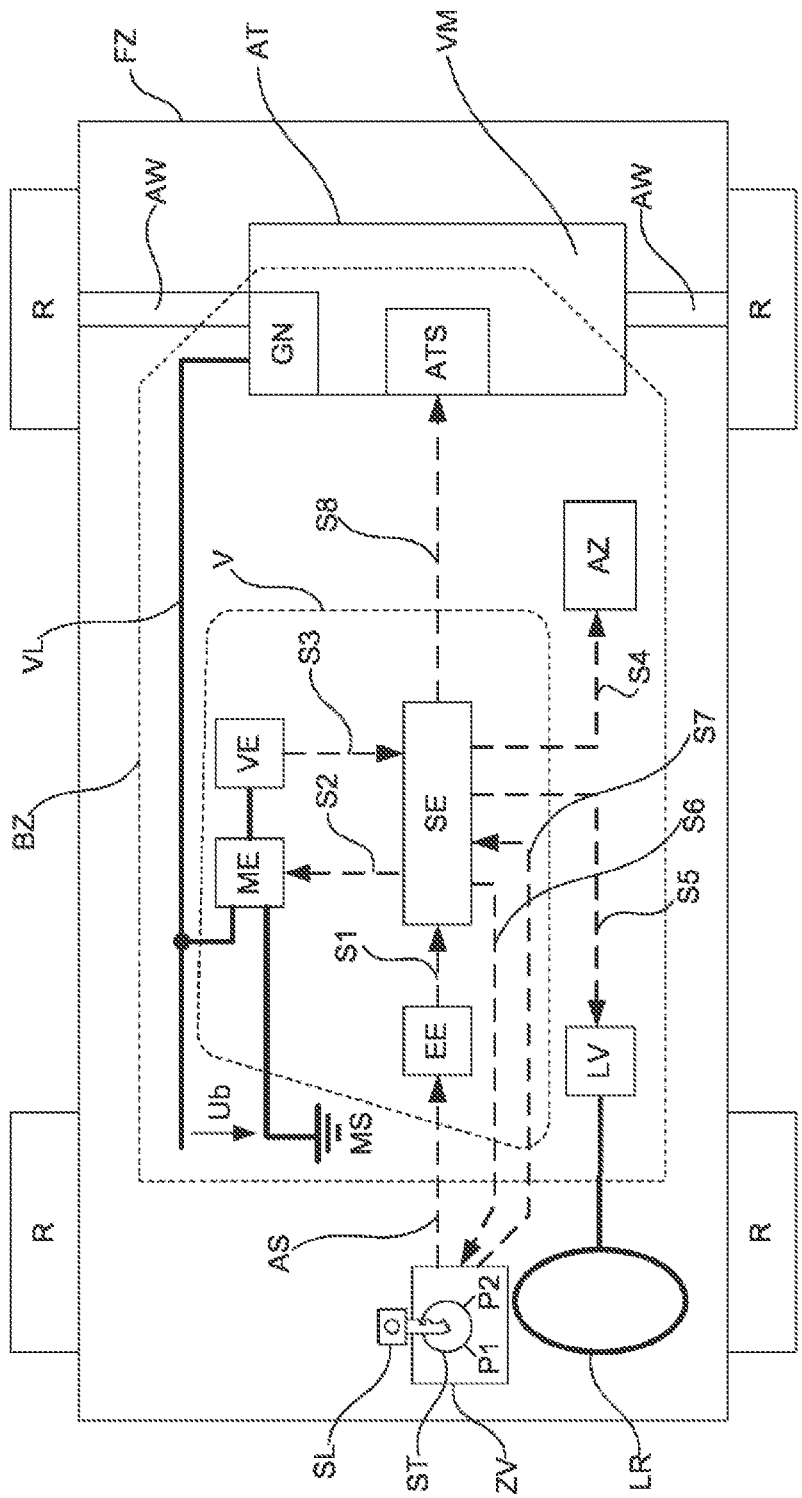
FIG. 1 shows in a schematic representation a vehicle having a device according to one embodiment of the invention.

Firstly, reference is made to FIG. 1 in which a vehicle FZ is shown diagrammatically. Accordingly, the vehicle FZ comprises four wheels R, an ignition lock arrangement ZV with a keyhole ST for receiving a vehicle key SL and a steering wheel LR for steering the vehicle FZ. Furthermore, the vehicle FZ comprises an on-board power system BZ and a drive assembly AT which drives the wheels R via a driveshaft AW.

The on-board power system BZ comprises, apart from the power consumers not shown in the figure such as, for example, air conditioner, an assistance system AZ for performing various vehicle functions and a steering wheel locking arrangement LV for locking/unlocking the steering wheel LR and a device V for controlling the assistance system AZ and the steering wheel locking arrangement LV.

The assistance system AZ is here a collective term for one or more systems in the vehicle which perform vehicle-safety-related or comfort functions of the vehicle. The functions of the assistance system AZ thus include primarily vehicle-safety-related functions such as, for example, an antiblocking function, a vehicle stabilization function or a distance control function and so forth. The functions of the assistance system AZ also include comfort functions such as, for example, an automatic on/off light switching function, a hill hold function and so forth.

Due to the high number of functions to be performed, the assistance system AZ consumes very much current in a normal operating state in which all vehicle-safety-related and comfort functions are performed. The assistance system AZ is, therefore, also operated in an emergency operating state if required, particularly if there is no adequate current available in the on-board power system. In this emergency operating state, the assistance system AZ only performs the vehicle-safety-related functions.

The drive assembly AT comprises an internal combustion engine VM, a generator GN and a drive control unit ATS. The generator GN is electrically connected to the on-board power system BZ via a power supply line VL and can thus be considered to be a component of the on-board power system BZ.

In the driving mode of the vehicle FZ, the generator GN, driven by the internal combustion engine VM, generates electrical current and feeds the on-board power system, or the electrical loads in the on-board power system, respectively, such as, for example, the device V, the assistance system AZ and the steering wheel locking arrangement LV with current.

The device V, in turn, comprises a detection unit EE for detecting a switch-off signal AS which is generated by the ignition lock arrangement ZV in a manner to be described in the text which follows and is indicative of a command to switch off the ignition of the drive assembly AT and thus the internal combustion engine V and the generator GN.

The device V also comprises a measuring unit ME for measuring a voltage value Vb of an on-board power system voltage Ub in the on-board power system BZ, that is to say a voltage potential at the power supply line VL with respect to a ground voltage potential at a ground point MS such as, for example, the vehicle chassis.

In addition, the device V comprises a comparison unit VE for comparing the measured voltage value Vb with a predetermined voltage threshold value Vt and a control unit SE for controlling the assistance system AZ and the steering wheel locking arrangement LV in dependence on the result of the comparison of the comparison unit VE.

In this context, the voltage threshold value Vt is approx. 14 volts (for example 13.6 volts) in this embodiment. This value is just below the voltage values of the on-board power system voltage Ub which is present in the on-board power system BZ as a rule when the generator GN, driven by the internal combustion engine VM, generates current and feeds it into the on-board power system BZ.

In contrast, a normal on-board power system voltage Ub is approx. 13.6 volts (for example 13 volts) when the generator GN is switched off and thus does not feed any current into the on-board power system BZ.

Figure 2:
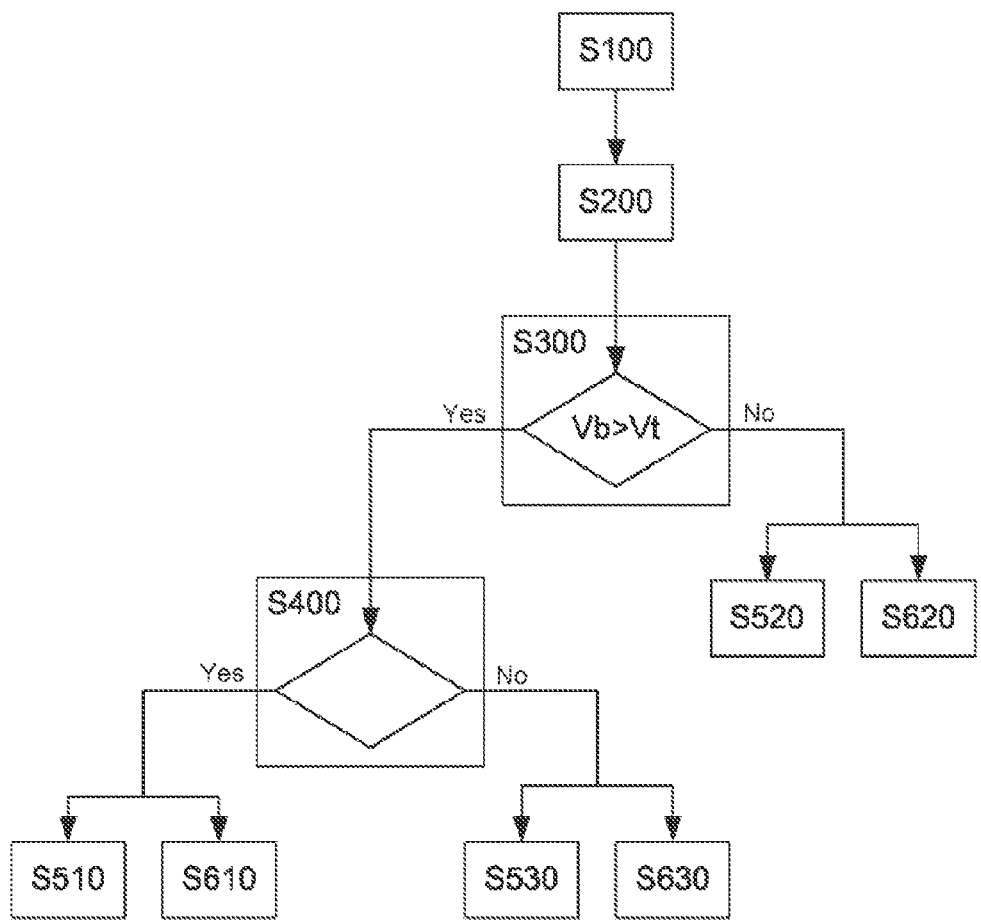
FIG. 2 shows in a diagrammatic flowchart a method of an embodiment of the invention.

Having described the vehicle FZ or the device V, respectively, of the vehicle FZ by means of FIG. 1, its operation will be illuminated in greater detail below with the aid of FIG. 2 in conjunction with FIG. 1.

During a driving mode of the vehicle FZ, the detection unit EE, according to a method step S100, monitors the switching state of the ignition lock arrangement ZV in that the detection unit EE monitors whether a switch-off signal AS is generated by the ignition lock arrangement ZV.

This switch-off signal AS is generated by the ignition lock arrangement ZV when the position of the vehicle key SL in the ignition lock arrangement ZV changes from a position P1 "ignition on" to a position P2 "ignition off", or, respectively, the key is taken from the keyhole. The switch-off signal AS is thus indicative of the command to switch off the ignition of the drive assembly AT.

If the switch-off signal AS is detected or as soon as the switch-off signal AS is present, the detection unit EE generates a signal S1 and delivers it via a bus link to the control unit SE in a manner known to the expert.

If the control unit SE receives the signal S1, the control unit SE generates and delivers a signal S2 to the measuring unit ME via a bus link in a manner known to the expert.

In addition, the control unit SE generates and delivers a further signal S6 to the ignition lock arrangement ZV and causes it to authenticate the vehicle key SL located in the keyhole ST in a manner known to the expert.

If the measuring unit ME receives the signal S2, it measures a voltage value Vb of the on-board power system voltage Ub in accordance with a subsequent method step S200 and forwards the measured voltage value Vb to the downstream comparison unit VE.

The comparison unit VE thereupon compares the measured voltage value Vb in accordance with a subsequent method step S300 in a manner known to the expert with a predetermined voltage threshold value Vt and delivers the result of the comparison to the control unit SE in the form of a further signal S3.

If the ignition lock arrangement ZV receives the signal S6 from the control unit SE, it checks whether the vehicle key SL located in the keyhole ST is one of the correct vehicle keys allocated to this vehicle and delivers the result of the authentication in the form of a further signal S7 to the control unit SE.

The control unit SE then analyzes the signal S3 delivered by the comparison unit VE and the signal S7 delivered by the ignition lock arrangement ZV and controls the assistance system AZ and the steering wheel locking arrangement LV in dependence on the two signals S3 and S7 and the signal S1, described before, from the detection unit EE in a manner to be described in the text which follows.

If the signal S3 provides information that the measured voltage value Vb exceeds the voltage threshold value Vt, the control unit SE, according to a further method step S400, checks whether the vehicle key SL is positively authenticated, that is to say whether the vehicle key SL is the correct one.

If the vehicle key SL is positively authenticated, the control unit SE, according to a further method step S510, generates and delivers a control signal S4 with a first signal level to the assistance system AZ and switches the assistance system AZ into an emergency operating state in which the assistance system AZ only performs the vehicle-safety-related functions such as, for example, the antiblocking function, the vehicle stabilization function or the distance control function. This guarantees the safety of the vehicle FZ.

Furthermore, the control unit SE, according to a further method step S610, generates and delivers a control signal S5 with a first signal level to the steering wheel locking arrangement LV and causes the steering wheel locking arrangement LV to keep the steering wheel in an unlocked state or to unlock it if it is already locked. The vehicle FZ thus remains still controllable. As an equivalent, the first signal level can also be designed as protocol. In this case, the switch-off signal AS is thus considered to be faulty and is simply ignored.

If the result of the authentication is negative, the control unit SE, according to a method step S530, generates and delivers the control signal S4 with a second signal level to the assistance system AZ and switches the assistance system AZ off completely.

Furthermore, the control unit SE, according to a method step S630, generates and delivers the control signal S5 with a second signal level to the steering wheel locking arrangement LV and causes the steering wheel locking arrangement LV to lock the steering wheel and to keep it in a locked state.

In this case, an attempt at manipulation by an unauthorized person at the vehicle FZ is assumed. Locking the steering wheel LR renders the vehicle FZ theft-proof.

If the signal S3 from the comparison unit VE provides information that the measured voltage value Vb does not exceed the voltage threshold value Vt, the control unit SE, according to a method step S520, generates and delivers the control signal S4 with the second signal level to the assistance system AZ and switches the assistance system AZ off completely.

Furthermore, the control unit SE, according to a method step S620, generates and delivers the control signal S5 with the second signal level to the steering wheel locking arrangement LV and causes the steering wheel locking arrangement LV to lock the steering wheel and to keep it in a locked state.

In addition, the control unit SE generates and delivers a control signal S8 with a first signal level to the drive control unit ATS and causes the latter to switch off the drive assembly together with the internal combustion engine VM and the generator GN. As an equivalent, the second signal level can also be designed as further protocol.

In this case, the switch-off signal AS is considered to be faultless and the corresponding measures described above for switching off the drive assembly AT are performed.

By means of the method described above, it is thus possible to effectively avoid the vehicle-safety-related assistance system AZ from being wrongly switched off during a driving mode of the vehicle FZ on a road by accidentally switching over the vehicle key or by a faulty switch-off signal AS and the steering wheel LR from being wrongly locked.

The method described above thus imparts increased safety at the vehicle FZ.

What is claimed is:

1. A method for controlling a vehicle, the method comprising:
    sensing the presence of a switch-off signal indicative of a command to switch off an ignition of a drive assembly of the vehicle,
    measuring a voltage value of an on-board power system voltage in an on-board power system of the vehicle in response to sensing the switch-off signal,
    comparing the measured voltage value to a predetermined voltage threshold value,
    switching an assistance system of the vehicle into an emergency operating state if the measured voltage value exceeds the predetermined voltage threshold value.

2. The method as claimed in claim 1, further comprising authenticating a vehicle key and switching the assistance system into the emergency operating state only if the vehicle key is authenticated.

3. The method as claimed in claim 1, wherein a steering wheel of the vehicle is not locked when the measured voltage value exceeds the predetermined voltage threshold value.

4. The method as claimed in claim 3, wherein the steering wheel is not locked only when the vehicle key is authenticated positively.

5. The method as claimed in claim 3, wherein the steering wheel is locked when the measured voltage value does not exceed the predetermined voltage threshold value.

6. The method as claimed in claim 1, wherein the assistance system is switched off when the measured voltage value does not exceed the predetermined voltage threshold value.

* * * * *